United States Patent [19]

Krohn et al.

[11] 4,273,585

[45] Jun. 16, 1981

[54] SEALING GLASS

[75] Inventors: David A. Krohn, Milford; Elias Snitzer, West Hartford; Peter E. Raber, Milford, all of Conn.

[73] Assignee: Exxon Research & Engineering Co., Florham Park, N.J.

[21] Appl. No.: 142,038

[22] Filed: Apr. 21, 1980

[51] Int. Cl.³ .............................................. C03C 3/14
[52] U.S. Cl. ................................................. 106/47 R
[58] Field of Search ..................................... 106/47 R

[56] References Cited

U.S. PATENT DOCUMENTS

| | | | |
|---|---|---|---|
| 3,211,826 | 10/1965 | Holcomb et al. | 106/47 R |
| 3,291,586 | 12/1966 | Chapman, Jr. et al. | 106/47 R |
| 3,759,727 | 9/1973 | Dietz et al. | 106/47 R |
| 3,778,242 | 12/1973 | Fravcel et al. | 106/47 R |
| 3,873,330 | 3/1975 | Sherk et al. | 106/47 R |
| 3,904,426 | 9/1975 | Frieser | 106/47 R |
| 3,966,449 | 6/1976 | Foster et al. | 106/47 R |
| 4,004,936 | 1/1977 | Powell | 106/47 R |

OTHER PUBLICATIONS

Takamori et al.; "Role of Copper Ions in Low Melting Solder Glasses" *Journal of American Ceramic Society*, vol. 59, No. 7–8, pp. 312–316.

*Primary Examiner*—O. R. Vertiz
*Assistant Examiner*—Mark Bell
*Attorney, Agent, or Firm*—Joseph J. Dvorak

[57] ABSTRACT

A sealing glass composition having a thermal coefficient of expansion (from room temperature to 300° C.) of about $90 \times 10^{-7}$/°C. and a softening temperature of about 406° C. is provided and consists essentially of the following ingredients in the following proportions: PbO, 66%; $B_2O_3$, 18%; ZnO, 15%; and Fining Agent, 1%.

2 Claims, No Drawings

SEALING GLASS

BACKGROUND OF THE INVENTION

1. Field of the Invention

The present invention relates to a glass composition. More particularly, the present invention relates to a glass composition for use as a cane glass seal of the type used, for example, in fusing together the plates of gas panel display devices and the like.

2. Description of the Prior Art

The fabrication of gas panel display devices requires that two glass plates be fused together and sealed. The glass used to fuse the two plates together is known as solder glass. Solder glass should have a low softening temperature so that fusing occurs at a temperature which will not alter the glass plates or other components to be assembled.

It is also important that the thermal expansion characteristics of the solder glass approxiate that of the plate glass or other glass to be fused. Otherwise, differential expansion between the solder glass and plate may cause excessive stresses which will fracture the seal or plates. This match of thermal characteristics should exist over a temperature range from room temperature to the temperature where the solder glass is rigid enough for strain to form.

Essentially, there are two separate techniques for forming glass seals of the type described. One involves the use of glass in a frit form which is applied (e.g. by screening) to the plate glass. The plates to be sealed are then stacked together and heated under appropriate conditions to form a permanent bond.

The second approach, and the one to which this invention pertains, involves the use of a so-called cane seal. In this case, a "cane" of a suitable solder glass is drawn, formed to the required shape, and placed between the two glass plates to be sealed. The assembly is then raised to the appropriate fusing temperature for the proper time to form an hermetic seal.

The cane seal has advantages over the frit seal in that the porosity associated with the frit seal is avoided and a better seal is produced. Furthermore, the glass frit must be applied in an organic binder which must be subsequently baked out. The cane seal requires no organic binder and thus eliminates a source of contamination as well as the added bake-out cycle.

Many conventional composition manipulations that would reduce the softening point or transition temperature of a glass would also tend to increase the coefficient of expansion of the solder glass beyond tolerable limits. Thus, conventional solder glasses have not proved acceptable for fusing together the glass plates of display panels and the like. One reported approach has involved the doping of a conventional alkali free lead borate solder glass with copper oxide. Through careful control of the valence state of the copper by oxidation—reduction equilibria, the softening point of the glass can be lowered while a close match is maintained between the expansion characteristics of the seal and plate glass.

A disadvantage of this process for manufacturing cane glass seal is that it is difficult to control the valence state of copper oxide.

Moreover, the various sealing glass compositions of this general type (with or without copper oxide) have also included silica (about 2-6% by weight) as a glass former, possibly to serve as a stabilizing agent. One aspect of this invention is based on the discovery that the presence of as little as 2% silica may tend to result in crystallization problems in the seal.

Examples of sealing glass compositions of the type described may be found in U.S. Pat. Nos. 3,873,330, 3,904,426 and 3,778,242. See also "Role of Copper Ions in Low-Melting Solder Glasses" by Takamori et al, *Journal of The American Ceramic Society*, Vol. 59, No. 7-8, pp. 312-316.

OBJECTS OF THE INVENTION

The principal object of this invention is to provide a glass composition, suitable for use as a cane glass seal, having a lower softening temperature than known sealing glasses and a thermal coefficient of expansion (TCE) of at least the same order of magnitude as the TCE of known sealing glasses.

A further object of the invention is to provide a cane glass seal wherein it is not required that the redox state of copper oxide be controlled.

A further object of the invention is to provide a cane glass seal wherein problems of contamination and crystallization associated with silica and/or copper oxide are substantially reduced if not eliminated.

SUMMARY OF THE INVENTION

Briefly, in accordance with the invention, a sealing glass composition comprises an alkali free lead borate including lead oxide in an amount of about 66% by weight, and including zinc oxide in an amount of about 15% by weight. A conventional fining agent may also be included.

DETAILED DESCRIPTION

A sealing glass, in accordance with the invention, consists essentially of the following ingredients in the following proportions:

| | |
|---|---|
| Pbo | 66% |
| $B_2O_3$ | 18% |
| ZnO | 15% |
| $As_2O_3$ | 1% |

The boron oxide ($B_2O_3$) is the glass former. The lead oxide (PbO) reduces the softening point of the glass. No silica ($SiO_2$) is included. Accurate control of expansion characteristics is provided by the zinc oxide (ZnO). Arsenic oxide ($As_2O_3$) is a conventional fining agent. Other fining agents such as antimony oxide can also be used.

The glass is made by thoroughly mixing the oxide powders and then firing the mixture at a temperature of about 1,000° C. for two hours until bubble free. Glass rods are cast at a temperature of about 800° C. and then annealed by conventional procedures to relieve residual strains.

The glass seal composition described above has a softening temperature of 406° C. and a fusion temperature of about 450° C. Its thermal coefficient of expansion (TCE) is about $90 \times 10^{-7}$ per degree C. from room temperature to 300° C.

The copper doped sealing glass composition of U.S. Pat. No. 3,873,330 (for example) has a softening temperature of about 412° C. and a TCE of about $84 \times 10^{-7}$/°C. Thus, the sealing glass composition of the invention has a substantially lower softening temperature and approximately the same TCE. In addition, because it is free of silica and copper, problems of crystallization in the fabrication and use of the glass composition of the '330 patent and other related compositions, are not encountered. Relatively small changes in the proportions given (in the order of one percent) can cause substantial changes in the properties of the glass that are relevant to its use as a seal glass.

What is claimed is:

1. A sealing glass composition having a thermal coefficient of expansion (from room temperature to 300° C.) of about $90 \times 10-7/°C$. and a softening temperature of about 406° C., consisting essentially of the following ingredients in the following proportions:

| | |
|---|---|
| Pbo | 66% |
| $B_2O_3$ | 18% |
| ZnO | 15% |
| Fining Agent | 1% |

2. A sealing glass composition according to claim 1, wherein the fining agent is $As_2O_3$.

* * * * *